United States Patent
Portin et al.

(10) Patent No.: US 7,957,889 B2
(45) Date of Patent: Jun. 7, 2011

(54) ADJUSTMENT SYSTEM FOR BALANCING THE CYLINDERS OF A GAS-BURNING INTERNAL COMBUSTION ENGINE

(75) Inventors: Kaj Portin, Vaasa (FI); Jenny Hellén, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 0 days.

(21) Appl. No.: 12/935,534

(22) PCT Filed: Mar. 25, 2009

(86) PCT No.: PCT/FI2009/050229
§ 371 (c)(1),
(2), (4) Date: Sep. 29, 2010

(87) PCT Pub. No.: WO2009/122012
PCT Pub. Date: Oct. 8, 2009

(65) Prior Publication Data
US 2011/0017173 A1 Jan. 27, 2011

(30) Foreign Application Priority Data

Mar. 31, 2008 (FI) .................................... 20085264

(51) Int. Cl.
*F02D 41/30* (2006.01)
(52) U.S. Cl. ...................... 701/104; 701/111; 123/435
(58) Field of Classification Search .................. 701/104, 701/111; 123/406.22, 406.42, 406.43, 435, 123/673
See application file for complete search history.

(56) References Cited

U.S. PATENT DOCUMENTS

| | | | |
|---|---|---|---|
| 5,450,829 A | | 9/1995 | Beck |
| 5,740,780 A | * | 4/1998 | Shimizu et al. .......... 123/406.22 |
| 6,209,520 B1 | * | 4/2001 | Kolmanovsky et al. ...... 123/435 |
| 6,516,780 B2 | * | 2/2003 | Liu ........................... 123/406.22 |
| 6,810,320 B2 | * | 10/2004 | Yamamoto et al. ........... 701/111 |
| 2002/0195086 A1 | | 12/2002 | Beck et al. |
| 2003/0041840 A1 | * | 3/2003 | Hiltner ..................... 123/406.42 |
| 2003/0188714 A1 | | 10/2003 | Yamamoto |
| 2004/0103714 A1 | | 6/2004 | Fukuoka et al. |
| 2005/0056255 A1 | | 3/2005 | Harris |
| 2009/0281713 A1 | * | 11/2009 | Jankovic et al. ............... 701/111 |

FOREIGN PATENT DOCUMENTS

| | | |
|---|---|---|
| DE | 10307367 A1 | 9/2004 |
| EP | 1061246 A2 | 12/2000 |
| EP | 1559887 A2 | 8/2005 |
| WO | WO 2005/088107 A1 | 9/2005 |

* cited by examiner

*Primary Examiner* — Erick Solis
(74) *Attorney, Agent, or Firm* — Muncy, Geissler, Olds, & Lowe, PLLC

(57) ABSTRACT

The invention relates to balancing the cylinders of an internal combustion engine. The invention comprises cylinder-specific pressure sensors (1) installed in the cylinders of an internal combustion engine for measuring the cylinder pressures as well as an adjustment unit (2). The adjustment unit is arranged to determine the maximum pressure and knock value of each cylinder as well as the mean maximum pressure of the cylinders as a response to the measurements of cylinder pressures and to determine the differences between the maximum pressure of each cylinder and the mean maximum pressure. The differences are compared to a certain deviation range of the mean maximum pressure and the knock value to a certain knock limit value. The duration of the fuel injection of the cylinder is adjusted in case the difference of a single cylinder exceeds the lower limit of the deviation range and the knock value of the cylinder is less than the knock limit value or the difference of the cylinders exceeds the upper limit of the deviation range.

15 Claims, 3 Drawing Sheets

Figure 1:
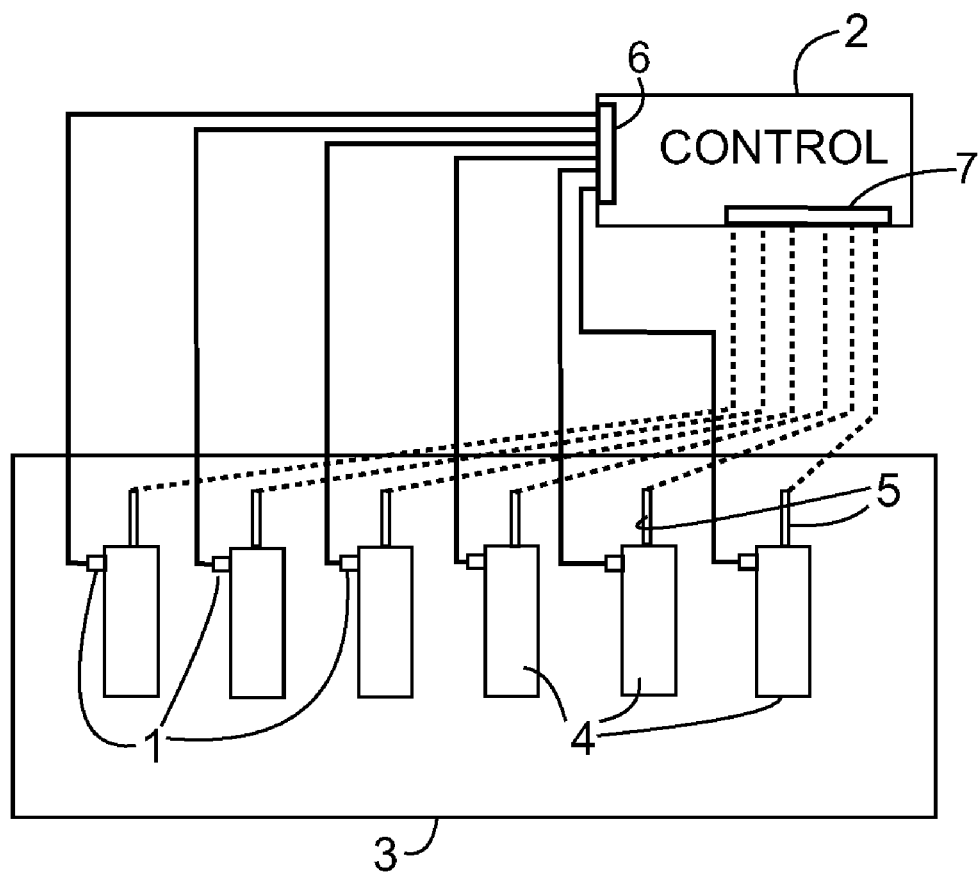

ADJUSTMENT SYSTEM FOR BALANCING THE CYLINDERS OF A GAS-BURNING INTERNAL COMBUSTION ENGINE

FIELD OF INVENTION

The present invention relates to balancing the cylinders of an internal combustion engine. The invention especially relates to internal combustion engines using gas as fuel. In this disclosure the term "gas-burning internal combustion engine" means an engine using only gas as fuel or gas and another fuel, in which case the engine is a so-called dual fuel internal combustion engine. The invention also relates to internal combustion engines using fuels other than gas. The aim of balancing the cylinders is to have each cylinder produce an equal amount of work, taking into account the combustion-technical internal differences between cylinders.

BACKGROUND ART

Fuel is introduced into the cylinders of an internal combustion engine and combusted. The combustion of fuel releases energy which is converted into mechanical movement by means of the piston. Usually the operation of a cylinder is divided into four strokes: intake of fuel, compression stroke, expansion stroke and exhaust removal. The combustion of fuel takes place between the compression and expansion strokes. Together the strokes form a cylinder cycle in which the piston of the cylinder has moved according to the strokes and returned to the initial position. The work done during the stroke is transmitted to the crankshaft. In order to have as smooth a rotation of the crankshaft it is preferable to have each cylinder produce a similar amount of work during the cycle. This is the aim of balancing the cylinders.

It is known to use measuring the temperature of the engine exhaust gas for balancing the cylinders, especially at low engine loads. (is it measured for each cylinder) The amount of fuel introduced into each cylinder is adjusted on the basis of the measurements. The amount of fuel has an effect on the amount of work the cylinder produces. This method, however, includes a certain delay.

When the engine load is higher, engine knock must be taken into account, as knocking can damage the engine. The reason for engine knock is spontaneous ignition of the fuel in the cylinder, causing an undesired method and timing of combustion. Engine knock is often divided into light knock and heavy knock. Light knock describes low fluctuations in the cylinder pressure. Heavy knock describes the highest fluctuations in the cylinder pressure. Light knock is reduced by controlling the ignition timing or the fuel/air ratio. Heavy knock is reduced by reducing the engine load (reducing the amount of fuel) or by even shutting the engine down, if other means are not enough. Knocking is cylinder-specific, so knock adjustment is cylinder-specific as well. Cylinder-specific knock sensors are used for detecting the level of knock. Thus, on highest engine loads the balancing of cylinders is carried out by means of adjustment for light knock. If the engine does not knock, the cylinders are not balanced. Thus, the problems of prior art are that there is a delay in balancing the cylinders and the balancing is necessarily made when the engine is running at highest loads.

BRIEF DESCRIPTION OF THE INVENTION

The aim of the invention is to reduce the problems of prior art. The purpose is achieved by means disclosed in the main claim. The system according to the invention comprises cylinder-specific pressure sensors 1 installed in the cylinders for measuring the cylinder pressures and an adjustment unit 2. The adjustment unit is arranged to define the maximum pressure and knock value of each cylinder as well as the mean maximum pressure of the cylinders as a response to the cylinder pressure measurements and to define the differences between the maximum pressure of each cylinder and the mean maximum pressure. The adjustment unit is also arranged to compare the value to a certain deviation range of the mean maximum pressure and the knock value up to a certain knock limit value and to control the duration of the fuel injection of the cylinder in case the difference of a single cylinder exceeds the lower limit of the deviation range and the knock value of the cylinder is less than the knock limit value or the difference of the cylinders exceeds the upper limit of the deviation range.

LIST OF FIGURES

Figure 2:
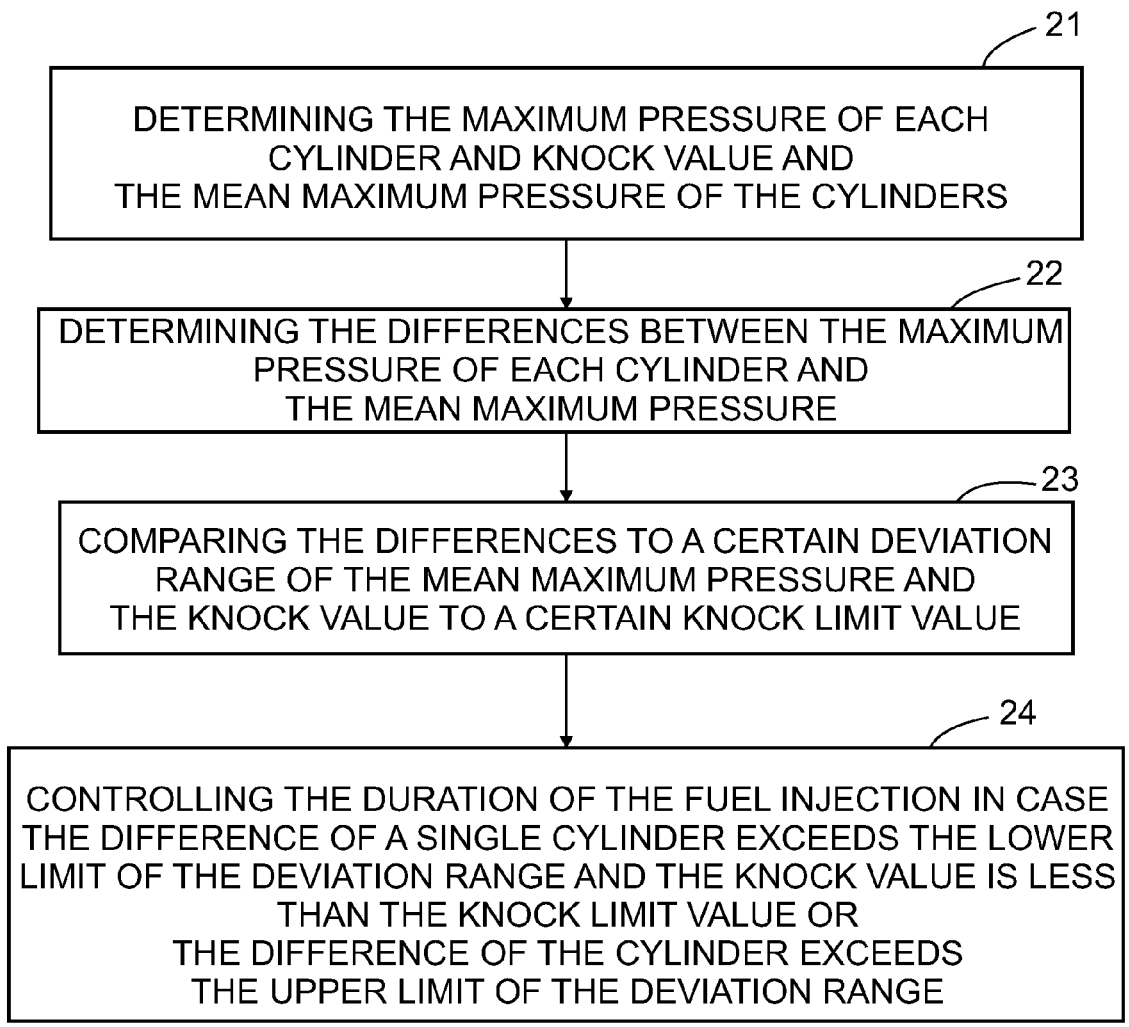
Figure 3:
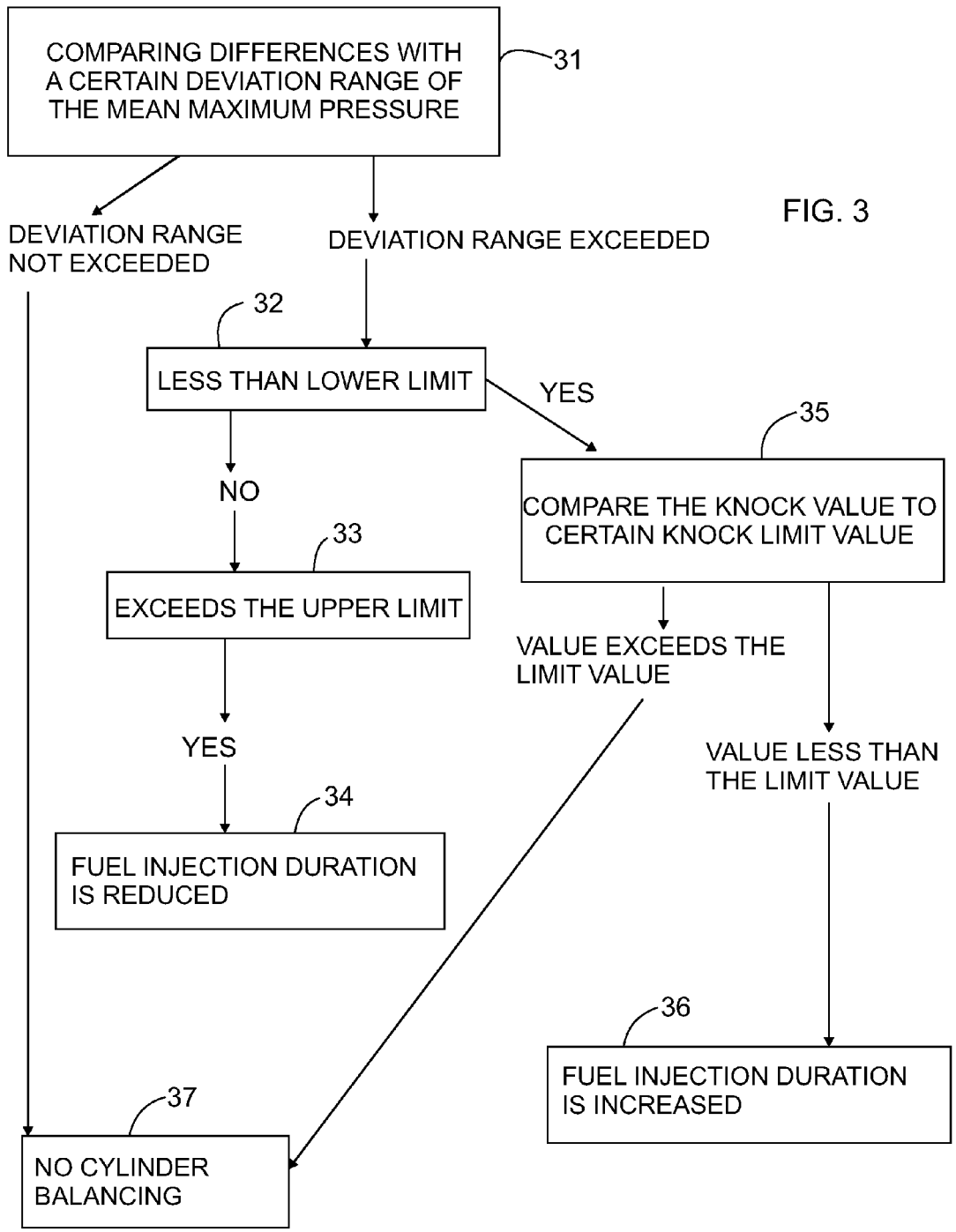

In the following the invention is described in more detail by reference to the figures in the drawing, in which FIG. 1 illustrates an example of the apparatus according to the invention FIG. 2 is a flow diagram of the method according to the invention, and FIG. 3 is a flow diagram example of the substeps of the method according to the invention.

DESCRIPTION OF THE INVENTION

FIG. 1 shows an example of a system according to the invention installed in an internal combustion engine 3. The system comprises cylinder-specific pressure sensors 1 installed in cylinders 4 for measuring the cylinder pressure and an adjustment unit 2. The pressure curve of a single cylinder follows the strokes during the cycle. The pressure is at its lowest during the intake of fuel and the removal of exhaust gases. The pressure increases during the compression stroke and reaches its maximum during the initial part of the expansion stroke. The measurement data of the cylinder pressure are sent to the adjustment unit 2 receiving the measurement data through a receiving interface 6.

The adjustment unit is arranged to determine the maximum pressure and knock value of each cylinder as well as the mean maximum pressure of the cylinders as a response to the measurements of cylinder pressures. The mean maximum pressure is arranged to be calculated from the measured maximum pressures of the cylinders. The knock value of the cylinder can also be acquired from the pressure sensor of the cylinder whereby no separate knock sensor is needed. The knock value is a value describing whether the cylinder knocks. It is known to use a cylinder-specific value for detecting light knock. If the measured value exceeds the limit of light knock, light knock adjustment is carried out. If the measured value is between zero and the limit value for light knock, there is no knock in the motor.

The adjustment unit is also arranged to determine the differences between the maximum pressure of each cylinder and the mean maximum pressure and to compare the differences with a certain deviation range of maximum pressure and the knock value to a certain knock limit value. In case the difference of a single cylinder exceeds the lower limit of the deviation range and the knock value of the cylinder is below the knock limit value or the difference of the cylinder exceeds the upper limit of the deviation range, the adjustment unit is arranged to control the duration of the fuel injection of the cylinder. The knock limit value is between zero and the limit for light knocking. The aim of the knock limit value is that the cylinder is not balanced if it knocks or is close to knocking.

The duration of the fuel injection of the cylinder is arranged to be shortened when the upper limit is exceeded. The duration of the fuel injection is arranged to be increased when the lower limit is exceeded and the knock value is below the knock limit value.

The used maximum pressure of a cylinder can be arranged to be the mean value of ten cycles of the cylinder. Correspondingly, the mean maximum pressure can be arranged to be the mean value of the average maximum pressure of ten cycles. This allows reducing the effect of random high or low maximum pressures to the control of the fuel injection of the cylinder. The amount of cycles can, of course, be also other than ten cycles. The upper and lower limits of the mean deviation range can be arranged to be dependent of the load of the motor.

The control unit has a control interface 7 via which the fuel injection means 5 of each cylinder is controlled. It should be noted that the interfaces 6, 7 can be realized in a number of ways, such as a common bus or separate cylinder-specific connectors.

FIG. 2 is a flow diagram example of the inventive method. As a response to the measurement data of pressure sensors the method comprises a step of determining the maximum pressure and knock value of each cylinder as well as the mean maximum pressure of the cylinders. The method also comprises the steps of determining the differences 22 between the maximum pressure of each cylinder and the mean maximum pressure, comparing the differences to a certain deviation range of the mean maximum pressure and the knock value to a certain knock limit value 23 and controlling the duration of the fuel injection of the cylinder in case the difference of a single cylinder exceeds the lower limit of the deviation range and the knock value of the cylinder is below the knock limit value or the difference of a cylinder exceeds the upper limit 24 of the deviation range.

FIG. 3 is an example of the substeps of the inventive method contained in the main steps 23 and 24. In the light of the example it is obvious that this is one way of realizing the main steps and its substeps and there are also other ways of realizing the main steps.

In the embodiment of FIG. 3 the differences between the maximum pressure of each cylinder and the mean maximum pressure are compared to a certain deviation range of the mean maximum pressure. The deviation range is a range on which the mean maximum pressure is allowed to be. If the difference remains within the deviation range, i.e. the deviation range is not exceeded, there is no need to balance 37 the cylinder. If the difference does not remain within the deviation range, i.e. the deviation range is exceeded, the system checks whether the range has been exceeded below the lower limit 32 of the deviation range. In this case the knock value of the cylinder is compared to a certain knock limit value 35. The magnitude of the knock limit value has been described above. If the knock value is below the knock limit value, the cylinder does not knock and the duration of the fuel injection can be increased 36. If the knock value is above the knock limit value, the cylinder knocks or is close to knocking, and the cylinder is not balanced. If the deviation range has been exceeded above 33 the upper limit, the duration of the fuel injection can be shortened 34. In this case the cylinder can be balanced, even if the cylinder knocked, because the balancing action also decreases the knocking.

The above description about the calculation of the mean maximum pressure and use of ten cycles also applies to other embodiments of the method. The lower and upper limits of the mean deviation range used in the method can be arranged to depend on the average value of the mean maximum pressure. In practice this means e.g. that the mean maximum value varies on the basis of the measurement results and when the middle point of the deviation range is fixed to the mean maximum pressure, also the upper and lower range of the deviation range follow the measurement results. As the cylinder pressure measurement results depend on the load of the motor, it can be stated that the deviation range can also be arranged to depend on the load of the motor.

As the invention uses maximum pressures of the cylinders, the pressures being direct measurement data from cylinders, the delay of the fuel injection control is small. The cylinders of the motor can also be balanced at higher motor loads. As the cylinders of the motor can be balanced at higher loads as well, the motor runs more smoothly, allowing also an increase of the motor load. In other words, the motors provided with the inventive adjustment system can be driven at higher loads than corresponding motors without the inventive adjustment system.

In the light of the above description and its examples it is obvious that the embodiment according to the invention can be realized in a number of ways. It is obvious that the invention is not limited to the examples mentioned here, but that the invention can be realized by a number of different embodiments.

Thus, any inventive embodiment can be carried out within the scope of the invention.

We claim:

1. An adjustment system for balancing cylinders of an internal combustion engine, which system comprises cylinder-specific pressure sensors installable in the cylinders for measuring cylinder pressures and an adjustment unit arranged to determine a maximum pressure and knock value of each cylinder, wherein the adjustment unit is further arranged to determine a mean maximum pressure of the cylinders as a response to measurements of cylinder pressures, determine differences between the maximum pressure of each cylinder and the mean maximum pressure, compare the differences to a certain deviation range of the mean maximum pressure and the knock value to a certain knock limit value, control duration of the fuel injection of the cylinder in case the difference of the single cylinder exceeds the lower limit of the deviation range and the knock value of the cylinder is below the knock limit value or the difference of the cylinder exceeds the upper limit of the deviation range.

2. The system according to claim 1, wherein the mean maximum pressure is arranged to be calculated from the measured maximum pressures of the cylinders.

3. The system according to claim 2, wherein the maximum pressure of each cylinder is the average value of the maximum pressure of ten cycles and that the mean maximum pressure is the average value of the mean maximum pressures of ten cycles.

4. The system according to claim 2, wherein the upper and lower limits of the mean deviation range are arranged to depend on the load of the motor.

5. The system according to claim 4, wherein it is arranged to reduce the duration of the fuel injection when the upper limit of the deviation range is exceeded and to increase the fuel injection duration when the lower limit of the deviation range is exceeded and the knock value is below the knock limit value.

6. The system according to claim 5, wherein the knock limit value is arranged to be between zero and the limit value of light knock.

7. The system according to claim 2, wherein the adjustment unit comprises an interface for receiving cylinder-specific pressure data and another interface for cylinder-specifically controlling the duration of the fuel injection.

8. The system according to claim 7, wherein is it connected to an internal combustion engine.

9. The system according to claim 7, wherein the used fuel is gas.

10. A method for balancing cylinders of an internal combustion engine, wherein, as a response to measurements of cylinder pressures, the method comprises steps of:
   determining a maximum pressure and knock value of each cylinder as well as a mean maximum pressure of the cylinders,
   determining differences between the maximum pressure of each cylinder and the mean maximum pressure,
   comparing the differences to a certain deviation range of the mean maximum pressure and the knock value to a certain knock limit value,
   controlling duration of the fuel injection of the cylinder in case the difference of the single cylinder exceeds the lower limit of the deviation range and the knock value of the cylinder is below the knock limit value or the difference of the cylinder exceeds the upper limit of the deviation range.

11. The method according to claim 10, wherein the mean maximum pressure is arranged to be calculated from the measured maximum pressures of the cylinders.

12. The method according to claim 11, wherein the maximum pressure of each cylinder is the average value of the maximum pressure of ten cycles and that the mean maximum pressure is the average value of the mean maximum pressures of ten cycles.

13. The method according to claim 11, wherein the upper and lower limits of the mean deviation range are arranged to depend on the load of the motor.

14. The method according to claim 13, wherein it is arranged to reduce the duration of the fuel injection when the upper limit of the deviation range is exceeded and to increase the fuel injection duration when the lower limit of the deviation range is exceeded and the knock value is below the knock limit value.

15. The method according to claim 14, wherein the knock limit value is arranged to be between zero and the limit value of light knock.

\* \* \* \* \*